United States Patent

[11] 3,616,270

| [72] | Inventor | Joseph A. Ferrara<br>P.O. Box 398 6411 Elwood St., Joshua Tree, Calif. 92252 |
|---|---|---|
| [21] | Appl. No. | 785,576 |
| [22] | Filed | Dec. 20, 1968 |
| [45] | Patented | Oct. 26, 1971 |

[54] PROCESS AND APPARATUS FOR FLASH DISTILLATION WITH PRESSURE AND FLOW OF LIQUID IN PREHEATER CONTROLLED
8 Claims, 1 Drawing Fig.

[52] U.S. Cl. ................................................. 203/47,
203/11, 203/86, 203/88, 203/100, 203/DIG. 1, 202/234, 203/DIG. 17
[51] Int. Cl. ..................................................... B01d 3/00
[50] Field of Search............................................ 203/11, 47, 48, 88, 86, 100, 100 DC, 99, DIG. 17; 202/234

[56] References Cited
UNITED STATES PATENTS

| 1,854,327 | 4/1932 | Baum | 203/86 |
| 2,490,659 | 12/1949 | Snyder | 202/234 |
| 3,088,882 | 5/1963 | Justice | 203/10 |
| 3,363,664 | 1/1968 | Vallanueva | 203/100 |
| 3,344,042 | 9/1967 | Hardesty | 203/48 |
| 3,459,640 | 8/1969 | Tsunawki et al. | 203/88 |

Primary Examiner—Wilbur L. Bascomb, Jr.
Attorney—Allan M. Shapiro

ABSTRACT: Water still system for utilizing solar energy and/or waste heat to distill water and chemicals. A pressure vessel having a given rate of thermal expansion is filled with a distillable feed liquid having a higher rate of thermal expansion. Application of heat, as by solar energy or waste heat, to the vessel causes the liquid to expand at a faster rate than the pressure vessel, thereby both pressurizing the liquid and elastically stretching the pressure vessel walls. The pressure vessel is provided with a liquid output control valve which opens at a predetermined pressure for discharging a small portion of the pressurized liquid through a vapor-producing device whereby the heat energy previously absorbed is converted into the heat of vaporization of the discharged liquid. Any dissolved solids in the liquid feed crystallize during vaporization of the pressurized liquid, followed by separation of the vapor and solids in an expansion chamber from which the vapor is bled off for condensation and storage.

PATENTED OCT 26 1971
3,616,270
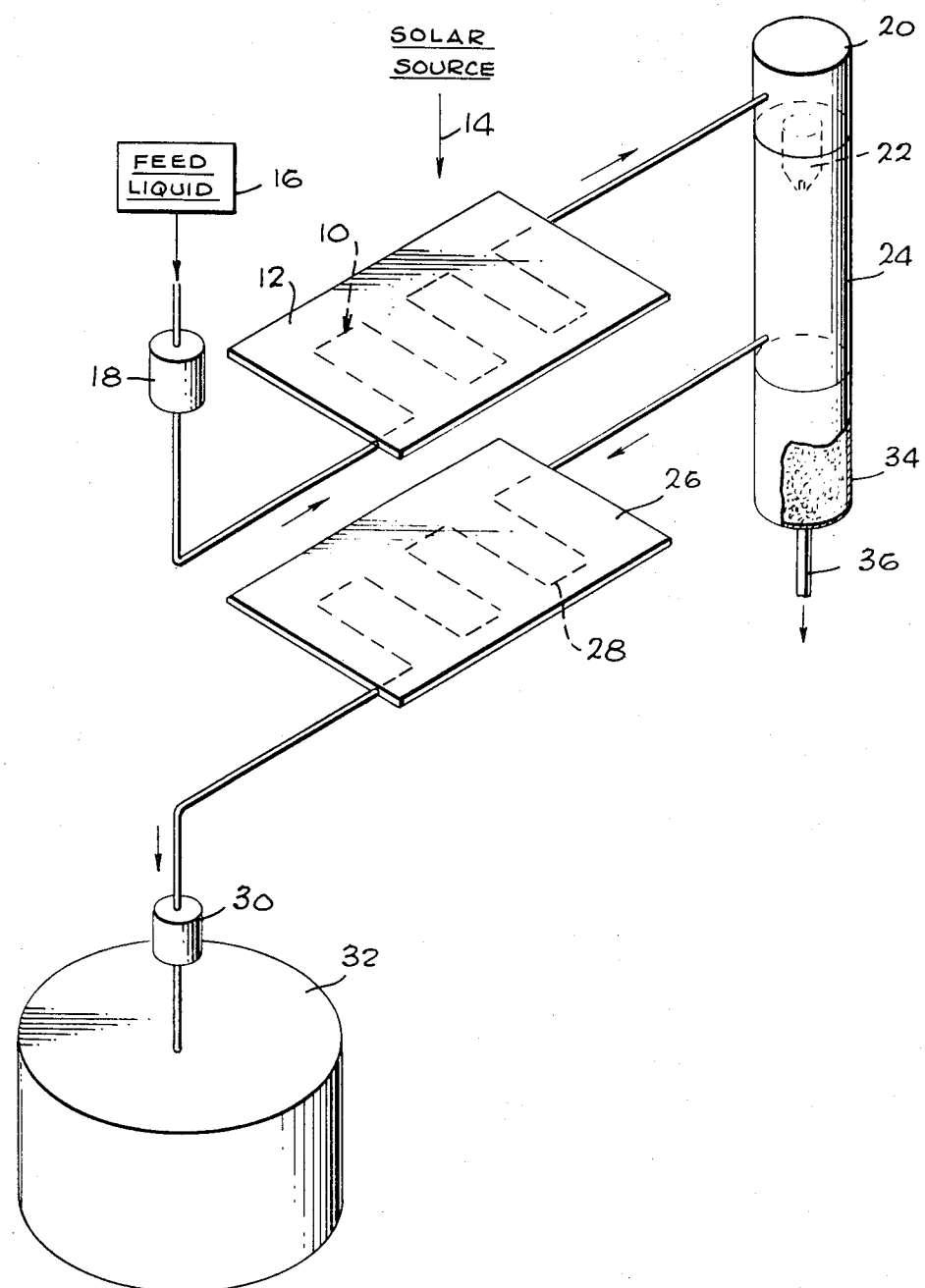
JOSEPH A. FERRARA
INVENTOR.
BY Allan M. Shapiro
ATTORNEY

PROCESS AND APPARATUS FOR FLASH DISTILLATION WITH PRESSURE AND FLOW OF LIQUID IN PREHEATER CONTROLLED

BACKGROUND OF THE INVENTION

1. Field of the Invention

The present invention relates to water distillation apparatus and processes and, more particularly, to methods and means for converting heat energy from readily available sources into potential energy via liquids from readily available sources, including nonpotable water, and then converting such potential energy into mechanical and vaporization energy for distillation of potable water, separation of solids from the liquid, driving an electric generator, and so forth.

2. Description of the Prior Art

There have been numerous attempts in the past to employ solar and waste energy for distilling water, generating steam, and otherwise converting available energy from the sun and other sources into a useful form of energy or power. However, in general, such attempts have resulted in inefficient, bulky, and expensive apparatuses generally incapable of continuous operation at remote locations and requiring unpredictable servicing and maintenance.

SUMMARY OF THE INVENTION

According to the present invention, a pressure vessel having a first rate of thermal expansion is filled with and contains a distillable feed liquid having a higher second rate of thermal expansion. Application of heat to the vessel, as by solar energy or waste heat, causes the contained liquid to expand at a faster rate than the pressure vessel, thereby both pressurizing the liquid and elastically stretching the pressure vessel walls. In the case of solar energy reception, the pressure vessel comprises a conduit formed in a metal plate for maximizing reception and absorption of solar heat and conduction transfer thereof to the liquid contained in the conduit. The conduit communicates at one end thereof with a supply source of feed liquid and is provided at the other end thereof with a liquid pressure control valve which automatically opens at a predetermined pressure for discharging a small portion of the pressurized liquid and automatically closes after a predetermined drop in pressure. Due to the totally filled confinement of the liquid in the conduit, together with the unequal or differential thermal expansion of the liquid and the pressure vessel, a relatively small rise in liquid temperature causes a relatively great rise in liquid pressure. The liquid pressure control valve communicates with a vapor producing device, such as a jet nozzle projecting into a chamber, so that the discharged portion of the pressurized liquid becomes vaporized as it is emitted into the chamber at relatively high velocities. In the case of water distillation, the initial feed liquid may be any form of nonpotable water such as, for example, sea water, substandard available water, any type of solids-containing water, whether soluble or insoluble solids, or even human waste water. Due to vaporization of the discharge liquid, the water vapor is separated from any of the previously contained solids, including dissolved salts or other solids which have crystallized during vaporization of the liquid. Separation of the vapor and solids is accomplished in an expansion chamber from which the vapor is bled off for condensation and storage. In one embodiment of the invention particularly adapted for water distillation, condensation is accomplished via a second metal plate of construction similar to the heat-receiving plate but maintained at a lower temperature in any convenient manner, as by shading from the sun's rays by the first plate, with discharge into a storage container. Repetitive discharge of vaporizing liquid and resupply of feed liquid automatically attains continued cycling operation of a pulsing type for continually producing distilled water or, if desired, mechanical energy via the jet nozzle as for pulsed operation of an electric generator.

Still other objects, features and attendant advantages of the present invention, together with various modifications, will become apparent to those skilled in the art from a reading of the following detailed description of the preferred embodiment constructed in accordance therewith, taken in conjunction with the accompanying drawing.

BRIEF DESCRIPTION OF THE DRAWING

The sole FIGURE is an exploded perspective view, partly diagrammatic, illustrating a water still system in accordance with the present invention.

DESCRIPTION OF THE PREFERRED EMBODIMENT

Referring to the drawing, there is seen an embodiment of the present invention adapted for producing potable water from nonpotable water containing dissolved salts, waste or other undesirable elements and comprising a pressure vessel 10 in the form of a continuous conduit formed in a tortuous path in a large-area metal plate 12 adapted to be exposed to the rays of the sun, as generally indicated by solar source arrow 14. An input end of the conduit vessel 10 is coupled to a source of feed liquid 16 via an input valve 18, which may be a check valve, and the other end of the conduit 10 is coupled to a valve 20 which is provided with a jet nozzle 22 communicating directly with the interior of an expansion chamber 24. A condensing plate 26, similar in construction to the pressure vessel plate 12, is provided with a tortuous water conduit 28, the input end of which is coupled to the expansion chamber 24, and the output end of which is coupled through a dump valve 30 to a storage container 32. A solids-receiving chamber 34 is removably connected to the expansion chamber 24, or may be made a part of the expansion chamber 24, and provided with a dump tube 36.

In operation, the pressure vessel 10 is completely filled with feed liquid from feed liquid source 16, as by gravity feed through check valve 18, pressure valve 20 being closed. Heating of plate 12 and pressure vessel 10 via heat source 14 causes the temperature of both the liquid contained in vessel 10 and the vessel itself to rise whereby both vessel 10 and its contained liquid tend to expand. Vessel 10 has a lower rate of thermal expansion than that of the feed liquid contained by vessel 10. Accordingly, the differential rate of expansion causes the contained liquid to be pressurized. The thermal expansion of the vessel 10 is within its structural elastic limits. A temperature rise of only a few degrees is sufficient to create enough pressure to cause the hereindescribed effects, and it may be noted that a pressure rise rate as great as 5,000 p.s.i. per minute may be attained.

Pressure increase continues until the pressure of the heated liquid is sufficient to open valve 20, the latter being of any type well known in the valve art for opening at a predetermined pressure and remaining open until the pressure has diminished to a predetermined lower pressure limit. Upon automatic opening of valve 20, a high-pressure jetstream of liquid is blown through jet nozzle 22 into expansion chamber 24. Immediate vaporization of the water from such jetstream of liquid occurs, with consequent immediate crystallization and separation of any solids previously contained by or dissolved in the feed liquid. Such solids drop downwardly through the expansion chamber 24 into the solids-receiving chamber 34 and are collected thereby. The water vapor in the expansion chamber 24, being under low or ambient pressure, pass from the expansion chamber 24 into the condensation conduit 28. Due to the relatively lower temperature of plate 26, as by physical location shading under plate 12, it constitutes a heat sink for conduit 28 and the vapor contained therein whereby the vapor is condensed into the liquid phase and passes through dump valve 30, which may be of the check valve type, into the water storage container 32 for ready availability and use of such potable water.

Valve 20 normally closes within a fraction of a second after its opening and release of the pressurized liquid. Due to the vaporization discharge of a portion of the contained liquid, the remainder of the contained liquid is rapidly cooled, as is its containing vessel 10, with a consequent rapid reduction in pressure to or below the ambient pressure. Immediately thereupon, input check valve 18 automatically opens and feeds liquid automatically flows, as by force of gravity, into vessel 10 for filling thereof. Valve 18 automatically closes when vessel 10 is filled. It now should be clear that the sequential steps of filling, heating, releasing and condensing and then the storage collecting of the final potable water are continually automatically performed by repetitive pulselike operation.

In a mechanical energy utilization system employing this invention, an electric generator (not shown) of any suitable type may be positioned with jet-receiving vanes adjacent the nozzle 22 whereby the intermittently pulsing jetstream will cause electricity to be generated in the well-known manner.

What is claimed is:

1. The process of recovering a purified liquid comprising the steps of:

filling a pressure vessel through an input end, said vessel having a first rate of thermal expansion with a liquid having a second net rate of thermal expansion differing from and greater than said first rate, said vessel having a normally closed output end;

closing said input end;

heating the vessel and liquid from a first low temperature to a second high temperature for causing differential expansion thereof for pressurizing the liquid and expanding the vessel within its elastic limit, said liquid remaining in the liquid state within said vessel;

opening said output end when the liquid pressure within said vessel reaches a predetermined pressure;

releasing a portion of such pressurized liquid from the vessel into a chamber for vaporizing such liquid portion and causing the temperature and pressure of the vessel and remaining liquid to be reduced to at least as low as the first temperature and the ambient pressure; and condensing such vaporized liquid portion.

2. The process of claim 1 comprising sequential repetition of said filling, closing, heating, opening, releasing, and condensing steps.

3. The process of claim 3 comprising the further step of collecting such condensate.

4. The process of claim 3 comprising sequential repetition of said filling, closing, heating, opening, releasing, condensing and collecting steps.

5. The process of claim 4 wherein such filling liquid contains at least one of a dissolved solid, a nondissolved solid and bacteria, and said heating and releasing steps generate sufficient heat, pressure and pressure release to cause separation of solid and sterilization of bacteria.

6. In a system for purifying liquids, vaporization apparatus comprising:

a pressure vessel having a first rate of thermal expansion;

liquid supply means coupled to said vessel through input means for feeding liquid to said vessel for filled containment thereby, said feed liquid having a second rate of thermal expansion greater than said first rate, said input means closing off said feed of liquid when said vessel is filled, said vessel having normally closed output valve means;

means for transferring heat to said vessel and its contained liquid for expansion of both said vessel and liquid whereby said contained liquid is pressurized and said vessel is expanded within its elastic limit;

said output valve means being coupled to said vessel in output relationship for automatically opening to release a portion of said pressurized liquid from said vessel at a first predetermined magnitude of liquid pressure within said vessel and closing to prevent further liquid release at a second predetermined magnitude of liquid pressure within said vessel, said first magnitude being greater than said second magnitude;

vaporization chamber means;

nozzle means communicating between said valve means and said vaporization chamber means for causing such released liquid to be vaporized into said chamber means; and means for coupling said vaporized liquid to condenser means 7. Apparatus as defined in claim 6 wherein said input means comprises input valve means for automatically permitting feed liquid to be supplied to said vessel only after said closing of said output valve means and until said vessel is filled whereby operation of said respective input and output valve means is sequential and intermittent.

8. Apparatus as defined in claim 7 including condenser means coupled to said chamber means by said means for coupling said vaporized liquid for receiving and condensing such vaporized liquid.

* * * * *